US009946582B2

(12) United States Patent
Araki

(10) Patent No.: US 9,946,582 B2
(45) Date of Patent: Apr. 17, 2018

(54) DISTRIBUTED PROCESSING DEVICE AND DISTRIBUTED PROCESSING SYSTEM

(75) Inventor: Takuya Araki, Tokyo (JP)

(73) Assignee: NEC Corporation, Tokyo (JP)

(*) Notice: Subject to any disclaimer, the term of this patent is extended or adjusted under 35 U.S.C. 154(b) by 530 days.

(21) Appl. No.: 13/879,005

(22) PCT Filed: Aug. 2, 2011

(86) PCT No.: PCT/JP2011/004366
§ 371 (c)(1),
(2), (4) Date: Apr. 11, 2013

(87) PCT Pub. No.: WO2012/049794
PCT Pub. Date: Apr. 19, 2012

(65) Prior Publication Data
US 2013/0191835 A1    Jul. 25, 2013

(30) Foreign Application Priority Data
Oct. 14, 2010   (JP) .................................. 2010-231144

(51) Int. Cl.
G06F 9/46         (2006.01)
G06F 9/54         (2006.01)

(52) U.S. Cl.
CPC ................ *G06F 9/54* (2013.01); *G06F 9/461* (2013.01)

(58) Field of Classification Search
None
See application file for complete search history.

(56) References Cited

U.S. PATENT DOCUMENTS

| | | | | |
|---|---|---|---|---|
| 6,112,225 A * | 8/2000 | Kraft | ..................... | G06F 9/5072 709/201 |
| 6,169,991 B1 * | 1/2001 | Tsukahara | ............. | G06F 9/5083 707/951 |
| 6,895,583 B1 * | 5/2005 | Koning | ................... | G06F 9/461 718/100 |
| 7,117,496 B1 * | 10/2006 | Ramesh | ................... | G06F 9/52 718/102 |
| 7,308,565 B2 * | 12/2007 | Bystricky | ............... | G06F 9/461 712/228 |

(Continued)

FOREIGN PATENT DOCUMENTS

| | | |
|---|---|---|
| JP | 04-218842 A | 8/1992 |
| JP | 08-263317 A | 10/1996 |

(Continued)

OTHER PUBLICATIONS

Japanese Office Action dated Oct. 6, 2015 with a partial English translation thereof.

(Continued)

*Primary Examiner* — Mehran Kamran
(74) *Attorney, Agent, or Firm* — McGinn IP Law Group, PLLC

(57) ABSTRACT

A distributed processing device includes an object storage unit that stores a continuation object including at least one of plural processes constituting a task and containing data of the task that is being processed, a processing unit that executes the continuation object retrieved from the object storage unit, and a storage processing unit that stores, in an execution state file, data stored in the object storage unit.

17 Claims, 15 Drawing Sheets

(56) References Cited

U.S. PATENT DOCUMENTS

| | | | | |
|---|---|---|---|---|
| 7,552,356 | B1* | 6/2009 | Waterhouse | G06F 17/30209 714/6.1 |
| 7,861,060 | B1* | 12/2010 | Nickolls | G06F 9/522 712/22 |
| 8,887,162 | B2* | 11/2014 | Ringseth | G06F 9/485 718/102 |
| 2002/0188713 | A1* | 12/2002 | Bloch | H04L 29/12009 709/223 |
| 2004/0064816 | A1* | 4/2004 | Alverson | G06F 9/461 718/102 |
| 2004/0235523 | A1* | 11/2004 | Schrire | H04M 1/274516 455/558 |
| 2006/0288299 | A1* | 12/2006 | Bystricky | G06F 9/461 715/744 |
| 2007/0101325 | A1* | 5/2007 | Bystricky | G06F 9/461 718/100 |
| 2007/0124363 | A1* | 5/2007 | Lurie | G06F 9/5072 709/202 |
| 2007/0136729 | A1* | 6/2007 | Neuman | G06F 9/4887 718/102 |
| 2008/0082489 | A1* | 4/2008 | Chen | G06F 17/30492 |
| 2008/0120616 | A1* | 5/2008 | James | G10L 15/22 718/100 |
| 2008/0244589 | A1* | 10/2008 | Darnell | G06F 9/4843 718/102 |
| 2009/0044195 | A1* | 2/2009 | Nichols | G06F 17/30176 718/106 |
| 2009/0204966 | A1* | 8/2009 | Johnson | G06F 9/4856 718/100 |
| 2009/0319749 | A1* | 12/2009 | Ogihara | G06F 3/061 711/170 |
| 2010/0115521 | A1* | 5/2010 | Morisada | G06F 9/5072 718/102 |
| 2010/0122065 | A1* | 5/2010 | Dean | G06F 17/30445 712/203 |
| 2010/0153967 | A1* | 6/2010 | Ringseth | G06F 9/485 718/106 |
| 2010/0299472 | A1* | 11/2010 | Tanaka | G06F 9/4812 710/269 |
| 2011/0131583 | A1* | 6/2011 | Geraci | G06F 9/505 718/104 |
| 2011/0145197 | A1* | 6/2011 | Kamohara | G06F 17/30286 707/647 |
| 2011/0161586 | A1* | 6/2011 | Potkonjak | G06F 12/084 711/122 |

FOREIGN PATENT DOCUMENTS

| | | | |
|---|---|---|---|
| JP | 2003-256233 | A | 9/2003 |
| JP | 2005-284647 | A | 10/2005 |
| JP | 2008-293358 | A | 12/2008 |
| JP | 2010-182141 | A | 8/2010 |

OTHER PUBLICATIONS

Madnick, et al., "Operating Systems", Fifth Edition, pp. 291-295, translated by Katsuo Ikeda, Jun. 15, 1983.
European Search Report dated Mar. 14, 2014.
International Search Report in PCT/JP2011/004366 dated Oct. 25, 2011(English Translation Thereof).
Jeffrey Dean, et al., "MapReduce: Simplified Data Processing on Large Clusters," OSDI, pp. 137-150, 2004.

* cited by examiner

FIG. 2A

```
int sample(int a) {
  int x = inc(a);
  return dbl(x);
}
int inc(int a){
  return a + 1;
}
int dbl(x){
  return x * 2;
}
```

FIG. 2B

```
void sample(int a, int* ret) {
  put_ctrlpool(make_cont(inc,a,ret));
}
void inc(int a, int*ret){
  int x = a + 1;
  put_ctrlpool(make_cont(dbl,x,ret));
}
void dbl(int x, int* ret){
  *ret = x * 2;
}
```

FIG. 3

(a)
```
template <class T1, class T2>
Cont* make_cont(void(*f)(T1,T2), T1 a1, T2 a2){
  return new RealCont2<T1,T2>(f,a1,a2);
}
```

(b)
```
class Cont {
public:
  virtual void run(){}
  virtual void set_arg1(void*){}
  ...
};
```

(c)
```
template <class T1, class T2>
class RealCont2 : public Cont {
  typedef void(*functype)(T1,T2);
public:
  RealCont2(void(*f)(T1,T2), T1 a1, T2 a2)
    : func(f), arg1(a1), arg2(a2) {
  ...
  }
  void run(){
    func(arg1,arg2);
  }
  void set_arg1(void* a){arg = *((T1*)a);}
private:
  functype func;
  T1 arg1;
  T2 arg2;
  ...
};
```

FIG. 6
(a)
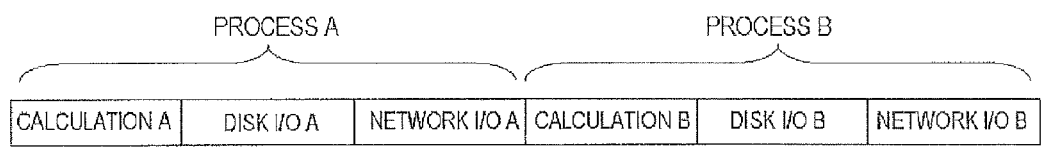
(b)
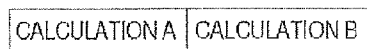

FIG. 9

```
void sample(Sync<int> a, Sync<int> ret) {
  a.read(make_cont_noarg1(inc, ret));
}
void inc(int a, Sync<int> ret){
  int x = a + 1;
  put_ctrlpool(make_cont(dbl,x,ret));
}
void dbl(int x, Sync<int> ret){
  ret.write(x * 2);
}
```

DISTRIBUTED PROCESSING DEVICE AND DISTRIBUTED PROCESSING SYSTEM

TECHNICAL FIELD

The present invention relates to a distributed processing technique.

BACKGROUND ART

Non-patent Document 1 describes an example of a conventional distributed processing system. This conventional distributed processing system is called MapReduce, and is formed by a distributed file system, and plural nodes for making a calculation. On the distributed file system, one file is split into multiple pieces (chunks), which are distributed across plural nodes. Further, a copy of each of the chunks is placed on the nodes, thereby securing reliability.

The conventional distributed processing system having such a configuration described above operates in the following manner. Calculation is made in two phases including a Map phase and a Reduce phase. In each of the nodes that makes a calculation, worker processes are performed. To the worker processes, a task (hereinafter, referred to as Map task) that performs the Map phase and/or a task (hereinafter, referred to as Reduce task) that performs the Reduce phase are/is assigned. Calculation of the worker processes is made by performing these assigned tasks.

In the Map phase, each Map task running in the worker process in each node reads chunks of at least one input file from a local or remote unit, and in parallel performs a Map function defined by a user. Here, it is assumed that the output from the Map function is a key-value pair. Then, using a split function defined by a user, determination is made as to which key is transferred to which Reduce task. On the basis of this determination, the key-value pairs are categorized, and are stored in a local disk.

Then, the Reduce task makes a request to each of the nodes for a key-value pair that this Reduce task is in charge of, and receives the key-value pair. The Reduce task assembles values for each key, and executes a Reduce function defined by a user using the assembled data as input. Each Reduce task outputs the calculation results to a distributed file system as separate files.

The conventional distributed processing system operates in the following manner in the case where failure occurs in the nodes during the operational processing. First, the distributed processing system causes another node to re-process all the Map tasks that have been completed in the node having the failure. This is because the output of the Map task is stored in the local disk on the node having the failure. In the case where all the Map tasks are re-processed as described above, the source of input of data is changed, and the worker process is notified to that effect. Note that it may be possible that the reduce task is not executed again. This is because the execution results are already stored in the distributed file system.

RELATED DOCUMENT

Non-Patent Document

Non-patent Document 1: Jeffrey Dean, Sanjay Ghemawat, "MapReduce: Simplified Data Processing on Large Clusters," OSDI, pages 137-150, 2004

SUMMARY OF THE INVENTION

As described above, in the case where failure occurs in a node with the MapReduce as the conventional distributed processing system, it is required to re-process all the Map tasks that have been already completed in the node having the failure. This means that the conventional distributed processing system does not store the execution states of the tasks that are being processed, and thus, cannot return to the execution state at a point in time in which the task was in progress. This may cause a delay in recovering the entire system.

MapReduce achieves high reliability by storing the input-output results in a highly reliable distributed file system. Thus, if a user wishes to obtain higher reliability, the user needs to change algorithms so as to be able to operate in a framework provided by MapReduce.

An object of the present invention is to provide a distributed processing technique having flexibility and high reliability.

To solve the problems described above, each aspect of the present invention employs the following configurations.

A first aspect of the present invention relates to a distributed processing device. The distributed processing device according to the first aspect includes an object storage unit that stores a continuation object including at least one of plural processes constituting a task and containing data of the task that is being processed, a processing unit that executes the continuation object retrieved from the object storage unit, and a storage processing unit that stores, in an execution state file, data stored in the object storage unit.

A second aspect of the present invention relates to a distributed processing system formed by plural computers. The distributed processing system according to the second aspect includes plural worker processes and a master process. Each of the worker processes includes an object storage unit that stores a continuation object including at least one of plural processes constituting a task and containing data of the task that is being processed, a processing unit that executes the continuation object retrieved from the object storage unit, and a storage processing unit that stores, in an execution state file, data stored in the object storage unit. The master process makes a request to each of the worker processes to cause the storage processing unit to perform the storage process at a predetermined time, and when making the request to perform the storage process, the master process assigns, to each of the worker processes, another worker process for storing the execution state file.

Further, another aspect of the present invention may be a distributed processing method including processes of the above-described constituent elements and performed by at least one computer, or may be a program that causes at least one computer to realize these constituent elements, or may be a computer-readable storage medium that stores the above-described program. This storage medium includes a non-transitory tangible media.

According to the present invention, it is possible to provide a flexible and highly reliable distributed processing technique.

BRIEF DESCRIPTION OF THE DRAWINGS

FIG. 2A is a diagram illustrating an example of a general task program.

FIG. 2B is a diagram illustrating an example of a task program processed by a distributed processing device according to the first exemplary embodiment.

FIG. 3 is a diagram each illustrating an example of a program for realizing generation of a continuation object.

FIGS. 6A and 6B are diagrams illustrating an example of contents of a process of a task and an example of timing at which each process is performed.

FIG. 9 is a diagram illustrating an example of a task program employing a synchronization variable.

DESCRIPTION OF EMBODIMENTS

Figure 1:
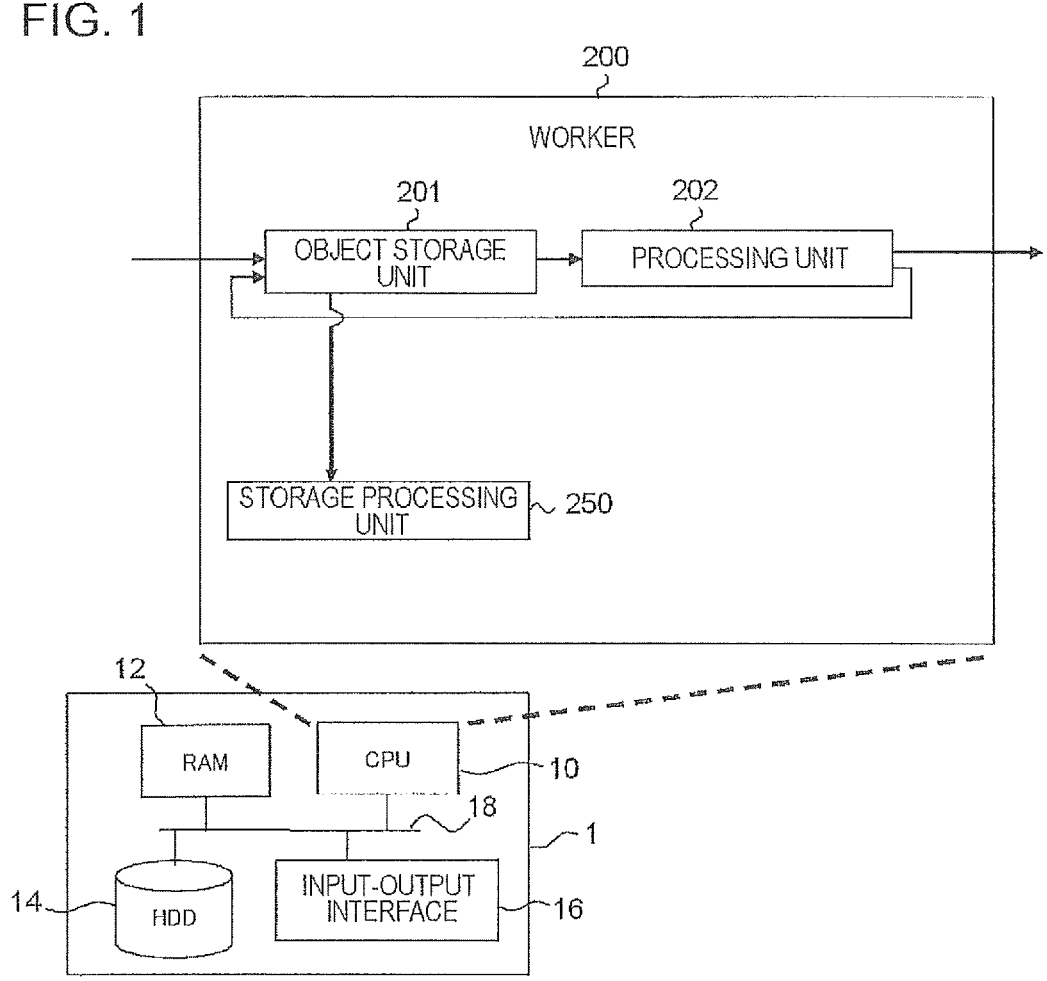
FIG. 1 is a schematic view illustrating an example of a configuration of a distributed processing device according to a first exemplary embodiment.

Hereinbelow, exemplary embodiments according to the present invention will be described with reference to the drawings. Note that, in all the drawings, the same constituent components are denoted by the same reference numerals, and detailed explanation thereof will not be repeated. Further, each of the exemplary embodiments below is merely an example, and the present invention is not limited to the configuration of each of the exemplary embodiments below.

First Exemplary Embodiment

[Example of Configuration of Device]

FIG. 1 is a schematic view illustrating an example of a configuration of a distributed processing device 1 according to a first exemplary embodiment.

As illustrated in FIG. 1, the distributed processing device 1 includes, as a hardware configuration, a central processing unit (CPU) 10, a memory such as a random access memory (RAM) 12, a read only memory (ROM), which is not illustrated, and a hard disk (HDD) 14, and an input-output interface 16. These hardware elements are connected, for example, through a bus 18. Note that this exemplary embodiment does not limit the hardware configuration of the distributed processing device 1.

The distributed processing device 1 includes a worker process 200 (hereinafter, also simply referred to as a worker). The worker 200 includes an object storage unit 201, a processing unit 202, and a storage processing unit 250. The distributed processing device 1 realizes the processing units described above, for example, by causing the CPU 10 to execute a program stored in the memory.

Upon receiving a task (job) to be processed, the worker 200 processes the received task. The task may be a Map task or Reduce task of MapReduce, or may be a task (processing target) generated in a project other than MapReduce. As described above, the worker 200 realizes a framework for processing the tasks.

The object storage unit 201 stores a continuation object including at least one of plural units of process constituting the task and containing data of the task obtained during the time when the task is being processed. The processing unit 202 retrieves the continuation object from the object storage unit 201, and executes the retrieved continuation object. The storage processing unit 250 stores, in an execution state file, the data stored in the object storage unit 201.

As described above, in the worker 200, the processing unit 202 executes the continuation object stored in the object storage unit 201, thereby processing the tasks. In this specification, "at least one unit of process contained in the continuation object" represents the concept of a process executed after a certain point in time during execution of a task (program). For example, the continuation object is realized as a class object in which a member variable and a member function such as run( ) in C++ are defined.

[Example of Operation]

Next, an example of operations performed by the distributed processing device 1 in the first exemplary embodiment will be described.

FIG. 2A illustrates an example of a general task program, and FIG. 2B illustrates an example of a task program processed by the distributed processing device 1 according to the first exemplary embodiment. FIG. 3 illustrates an example of a program for realizing generation of the continuation object. The examples of program illustrated in FIG. 2A, FIG. 2B, and FIG. 3 are examples described in C++ language. However, this exemplary embodiment does not limit the description language to C++.

FIG. 2A and FIG. 2B each illustrate a program for processing in which 1 is added to variable "a" provided to an argument, and then the value thus obtained is multiplied by 2 (=(a+1)×2). In the general program illustrated in FIG. 2A, (a+1) is executed with an inc function; the execution result is used as an argument to call a dbl function; the argument is multiplied by 2 in the dbl function; and the result is outputted. In this case, for example, the execution state of the program at a point in time when the inc function ends is placed on a stack managed by the C++ framework. Thus, it is difficult to store the execution state at this point in time, and perform recovery with the stored data.

In the case where the task illustrated in FIG. 2B is processed, the distributed processing device 1 according to the first exemplary embodiment generates two continuation objects, and stores the generated continuation objects in the object storage unit 201, and the processing unit 202 sequentially executes the continuation objects. For example, in the case where 1 is given to the variable "a" to execute a function sample, the inc function and the argument "a" (=1) are used as an argument to call a make_cont function, thereby generating a continuation object. This continuation object has the inc function as a unit of process, and contains the value (=1) of the variable "a" and a ret pointer as data of the task obtained during the time when the task is being processed. Then, the generated continuation object is used as the argument to call a put_ctrlpool function, thereby storing the continuation objects in the object storage unit 201.

The processing unit 202 retrieves the continuation object from the object storage unit 201, and uses the argument "a" (=1) to execute the inc function with an argument. In the example illustrated in FIG. 2B, the make_cont function is also called in the inc function, and hence, the processing unit 202 generates the next continuation object using the dbl function and the argument "x" (=2) (=1+1). The generated next continuation object has the dbl function as the unit of process, and contains the value (=2) of the variable "x" and the ret pointer calculated with the inc function as the data of the task obtained during the time when the task is being processed.

The processing unit 202 calls a put_ctrlpool function with an argument of the thus generated next continuation object, and stores the continuation object in the object storage unit 201. Then, the processing unit 202 retrieves the continuation object from the object storage unit 201, and executes the retrieved continuation object. Further, the dbl function is executed using the argument "x" (=2), a value of the variable ret is set to 4, and the process is completed.

In the example described above, the continuation object stored in the object storage unit 201 holds the execution state of the task at the point in time when the process of the inc function ends. More specifically, the continuation object holds the value (=2) of the variable "x" calculated with the inc function. Thus, the storage processing unit 250 stores the continuation object in the execution state file, whereby it is possible to cause the processing unit 202 to process this continuation object thereafter.

As described above, according to the first exemplary embodiment, the continuation object reflecting the state of the task that is currently processed can be stored in the execution state file, whereby it is possible to easily store the state of the task that is currently processed in the worker 200. This effect can be achieved by the worker 200 regardless of tasks to be processed. Thus, the first exemplary embodiment can be applied to various kinds of tasks, and further, makes it possible to establish a flexible system structure.

The make_cont function described above can be achieved as illustrated in FIG. 3 as an example. In the example illustrated in FIG. 3(a), the make_cont function is achieved as a template function. In the make_cont function, an object with a RealCont2 class, which is a template class, is generated, and this object is returned. In this example in FIG. 3(a), the continuation object (objects with the RealCont2 class) contains a function with two arguments. However, this exemplary embodiment does not limit the object to the continuation object as described above. For example, it is only necessary to prepare a class library capable of handling a function with various number of arguments.

FIG. 3(b) shows definition for a Cont class. The Cont class contains definition of a run( ) member function and definition of a set_arg1( ) member function. The set_arg1( ) member function is used to handle a synchronization variable and a queue, which will be described later.

FIG. 3(c) shows definition for a RealCont2 class. With the constructor, a given argument is stored in a member variable. Further, a run( ) member function is defined. With this run( ) member function, a function pointer and the argument are used to execute the function indicated by the function pointer.

The generation function for a continuation object and the function for inputting the continuation object into the object storage unit 201 may be realized by a library. This library may be included in the worker 200 in advance, or may be sent from other processes.

As illustrated in the example of the operation above, it may be possible to employ a configuration in which the processing unit 202 executes the continuation object to generate the next continuation object, the generated next continuation object is stored in the object storage unit 201, and then, the execution of the continuation object ends. With this configuration, the execution of the continuation object ends after the next continuation object is stored in the object storage unit 201. Thus, the process of the processing unit 202 can be temporarily stopped at the end of the execution of the continuation object, which makes it possible to reliably store the state of the task that is being executed.

It is desirable to divide each of the continuation objects in a manner such that time required for processing each of the continuation objects is sufficiently short. For example, in the case where the task contains a process requiring long execution time such as a loop having a large number of repeat or block processes, it is desirable to describe a program of the task in a manner such that the rest of the process is set as the continuation object and is inputted into the object storage unit 201. With this configuration, according to this exemplary embodiment, the process of the task can be stopped at some midpoint during the process of the task, whereas, in the conventional method, once the process of the task is started, the execution of the task object continues until the end of the process. More specifically, when the processing unit 202 ends the process of one continuation object, the processing unit 202 can be temporarily stopped at some point in time before the next continuation object is retrieved. With this configuration, by storing the data existing in the object storage unit 201, the execution state at this point in time can be reliably stored.

Second Exemplary Embodiment

Figure 4:
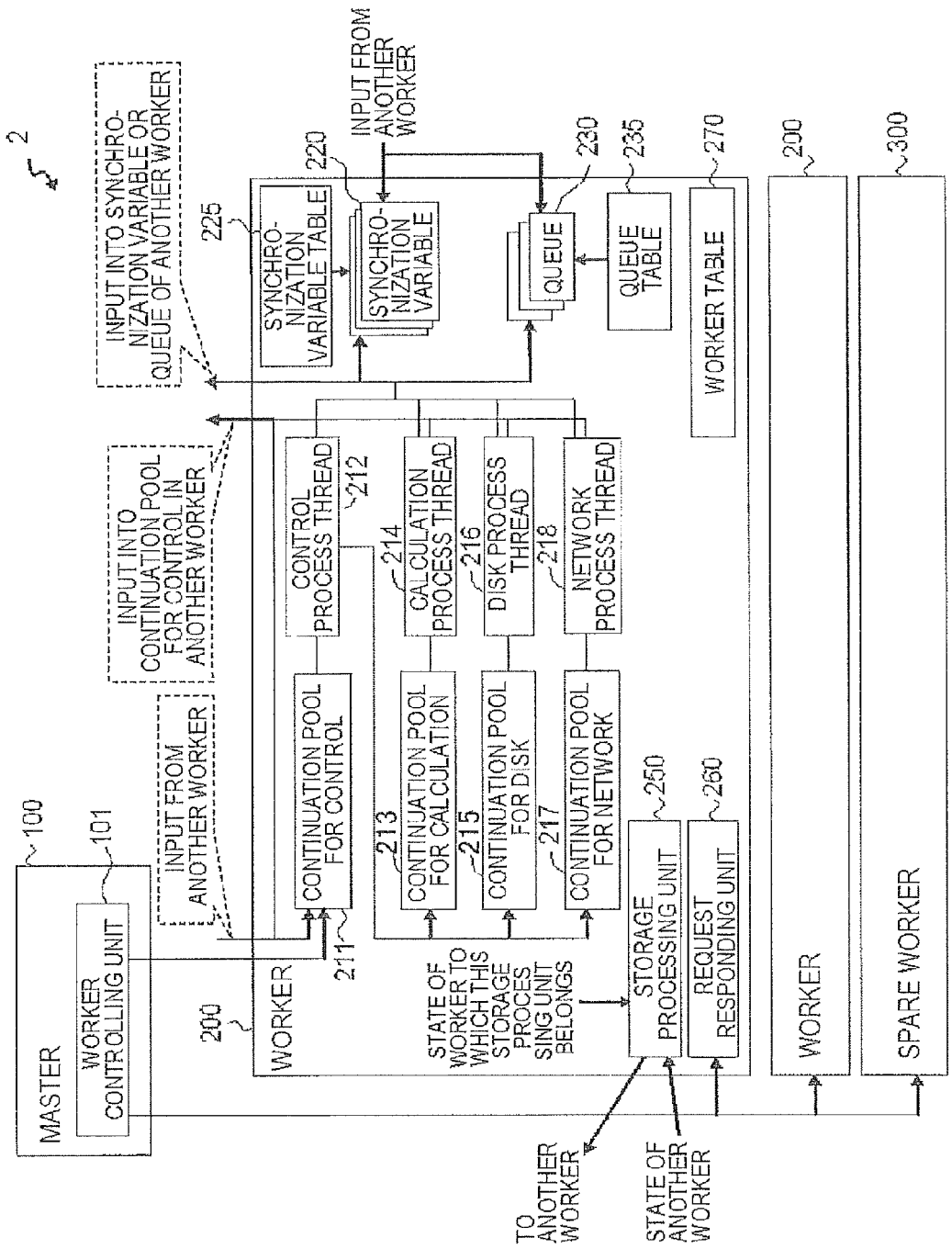
FIG. 4 is a schematic view illustrating an example of a process configuration of a distributed processing system according to a second exemplary embodiment.

FIG. 4 is a schematic view illustrating an example of a process configuration of a distributed processing system 2 according to a second exemplary embodiment.

The distributed processing system 2 according to the second exemplary embodiment includes plural workers 200, a master process 100 (hereinafter, also referred to as a master) that controls each of the workers 200, and a spare worker process 300 (hereinafter, also referred to as a spare worker). Note that the hardware configuration of the distributed processing system 2 according to the second exemplary embodiment will be described later.

[Worker Process]

In the second exemplary embodiment, each of the workers 200 includes a continuation pool 211 for control, a control process thread 212, a continuation pool 213 for calculation, a calculation process thread 214, a continuation pool 215 for disk, a disk process thread 216, a continuation pool 217 for network, a network process thread 218, a synchronization variable 220, a synchronization variable table 225, a queue 230, a queue table 235, a storage processing unit 250, a request responding unit 260, and a worker table 270.

The continuation pool 211 for control, the continuation pool 213 for calculation, the continuation pool 215 for disk, and the continuation pool 217 for network correspond to the object storage unit 201 in the first exemplary embodiment. More specifically, each of the workers 200 in the second exemplary embodiment includes plural object storage units 201. As illustrated in FIG. 4 as an example, it is preferable to employ a configuration in which the object storage units 201 each store a continuation object that uses a different calculation resource. Hereinbelow, the continuation pool 211 for control, the continuation pool 213 for calculation, the continuation pool 215 for the disk, and the continuation pool 217 for the network may be also referred to as continuation pools.

The continuation pool 213 for calculation stores a continuation object in which a unit of process is set to a portion of the task that only makes a calculation. The continuation pool 215 for the disk stores a continuation object in which a unit of process is set only to an input-output process for the hard disk 14 in the task. The continuation pool 217 for the network stores a continuation object in which a unit of process is set only to an input-output process for the network interface contained in the input-output interface 16. The continuation pool 211 for control stores a continuation object in which a unit of process is set to processes other than those described above. Assuming that the put_ctrlpool function in the example illustrated in FIG. 2B and FIG. 3 are functions for storing the continuation object in the continuation pool 211 for control, the above-described configuration can be realized, for example, by preparing functions (for example, put_networkpool) for storing the continuation objects in each of the continuation pools.

The continuation pool 211 for control, the continuation pool 213 for calculation, the continuation pool 215 for the disk, and the continuation pool 217 for the network can store the plural continuation objects as described above. Each of the continuation pools is realized by a given data structure that processes a group of data such as a queue and a stack.

The control process thread 212, the calculation process thread 214, the disk process thread 216, and the network process thread 218 correspond to the processing unit 202 in the first exemplary embodiment. More specifically, the workers 200 in the second exemplary embodiment each have plural processing units 202. In the example illustrated in FIG. 4, the processing units 202 are each provided so as to execute a continuation object that uses a different calculation resource. The calculation resource includes, for example, a memory resource of a hard disk, a resource of a protocol stack for using the network, an image processing resource for displaying on a display. It may be possible to employ a configuration in which different processing units 202 process continuation objects that use the same calculation resource. As described above, the processing units 202 are associated with the respective object storage units 201 each storing a continuation object to be executed, and execute the continuation object obtained from the predetermined object storage unit 201.

The control process thread 212 executes a continuation object retrieved from the continuation pool 211 for control. The calculation process thread 214 executes a continuation object retrieved from the continuation pool 213 for calculation. The disk process thread 216 executes a continuation object retrieved from the continuation pool 215 for the disk. The network process thread 218 executes a continuation object retrieved from the continuation pool 217 for the network. With the configuration as described above, the continuation objects can be executed in parallel. Hereinbelow, the control process thread 212, the calculation process thread 214, the disk process thread 216, and the network process thread 218 are also referred to as process threads.

Each of the process threads checks the presence or absence of a request to stop a thread every time when the processing of the continuation object ends. The presence or absence of the request to stop the thread is notified to each of the process threads by the request responding unit 260. This notification may be realized by writing data indicating the presence or absence of the request to stop the thread into a memory shared between the request responding unit 260 and the process threads. If each of the process threads determines that there is a request to stop the thread, these process thread stop the processes, in other words, suspend the retrieval of the continuation objects from the corresponding continuation pools.

Each of the workers 200 has a mechanism for synchronizing data between continuation objects so as to be able to execute the continuation objects in parallel. This synchronization mechanism is realized by the synchronization variable 220, the synchronization variable table 225, the queue 230, and the queue table 235.

The synchronization variable 220 has a data structure in which, when an undefined variable value is subjected to a read out process, the process is blocked, and once the variable value is defined, the blocked process is resumed, and the variable value is read out. However, the variable synchronization mechanism according to this exemplary embodiment can perform variable synchronization without blocking the process, thereby reducing the time required for executing the continuation object. The synchronization variable 220 is realized, for example, as a synchronization variable object.

The variable synchronization mechanism according to this exemplary embodiment operates in the following manner. The variable synchronization mechanism receives an assignment of a continuation object when a synchronization variable 220 performs the read-out, holds the continuation object until the synchronization variable 220 is defined, and, once the synchronization variable 220 is defined, causes a corresponding process thread to execute the continuation object using the synchronization variable 220 as an argument. With this configuration, in the case where the continuation object that is currently processed reads out the undefined synchronization variable 220, the process thread registers the next continuation object in the synchronization variable 220, and then ends the execution of the continuation object.

When the synchronization variable 220 is used, the variable synchronization mechanism stores information concerning the synchronization variable 220 in the synchronization variable table 225. More specifically, the synchronization variable table 225 stores information concerning the synchronization variables 220 that are currently used. As the information concerning the synchronization variable 220, identification information (hereinafter, referred to as a synchronization variable ID) for identifying the synchronization variable 220 and the object for the synchronization variable 220 are stored.

The synchronization variable 220 can be defined from another worker 200. In the case where recovery is made, the address of the synchronization variable 220 changes. Thus, when the synchronization variable 220 is designated from the other worker 200, this address cannot be used, and hence, the synchronization variable 220 is managed with the synchronization variable ID as described above. The other worker 200 uses this synchronization variable ID to designate the synchronization variable 220.

The queue 230 has finite or infinite data size. In this exemplary embodiment, for the convenient purpose, an example is given using the queue. However, in general, the queue may be called a data retaining unit. More specifically, this exemplary embodiment does not limit the data retaining mechanism to the queue, and the data retaining mechanism may have a data structure such as a stack.

In the case where the queue 230 is defined to have a finite size, the queue 230 has a data structure in which a process of inputting data having a size equal to or more than the finite size is blocked, and a process of retrieving data not retained is blocked. However, the data synchronization mechanism according to this exemplary embodiment can retain data without blocking processes, thereby reducing the time required for executing the continuation object. The queue 230 is realized, for example, as a queue object.

The queue 230 has an input waiting list and a data waiting list, and operates in the following manner. When data is inputted into the queue 230 and the data is retrieved from the queue 230, the queue 230 receives an assignment of a continuation object. In the case where the queue 230 does not have a space sufficient for receiving an amount of the data inputted at the time of data input, the queue 230 retains the inputted data and the assigned continuation object in the input waiting list in a manner that they are associated with each other.

If sufficient space becomes available in the queue 230, the data retained in the input waiting list is inputted into the queue 230, and then, a corresponding process stack is caused to execute the continuation object associated with the inputted data. Further, in the case where the queue 230 does not have data to be retrieved at the time of data retrieval, the queue 230 retains the assigned continuation object in the data waiting list. If the data is inputted into the queue 230, the queue 230 retrieves the data, and causes a corresponding process stack to execute the continuation object retained in the data waiting list using the retrieved data as an argument. With this configuration, in the case where the continuation object performs the process of retrieving the data from the empty queue 230 with the continuation object in process or the process of inputting the data exceeding the limitation of the queue 230, the process stack retains the next continuation object so as to associate the next continuation object with the queue 230, and then, ends the execution of the continuation object.

In the case where a queue 230 is used, information concerning the queue 230 is stored in the queue table 235. More specifically, the queue table 235 stores information on each of the respective queues 230 to be used. As the information on the queue 230, identification information (hereinafter, referred to as a queue ID) for identifying the queue 230 and an object of the queue 230 are stored.

The queue 230 can be used from another worker 200. In the case where recovery is made, the address of the queue 230 changes. Thus, when the queue 230 is designated from the other worker 200, this address cannot be used, and hence, the queue 230 is managed with the queue ID as described above. The other worker 200 uses the queue ID to designate the queue 230.

The variable synchronization mechanism and the data retaining mechanism as described above can be realized as a library. This library may be contained in the worker 200 in advance, or may be sent from the other process.

As described above, it is possible to use the continuation pools 211, 213, 215, and 217, the synchronization variable 220, and the queue 230 not only from a process thread within the worker 200 but also from the other worker 200. In other words, the second exemplary embodiment makes it possible for one worker 200 to input a continuation object into a continuation pool of the other worker 200, define and refer to the synchronization variable 220 of the other worker 200, input data into the queue 230 of the other worker 200, and retrieve data from the queue 230 of the other worker 200. This is achieved through communication between the workers 200.

The worker table 270 is used to make communication between the workers 200. The worker table 270 stores, for each of the workers 200, a worker ID for identifying the respective workers 200 and address information. The address information includes, for example, an IP address of a device in which the worker 200 exists and a port number. When a process thread tries to access the continuation pool, the synchronization variable, the queue, and other information of the other worker 200, the process thread acquires the address of the other worker 200 from the worker table 270, and designates the address, thereby gaining the access. The communication between the workers 200 can be achieved using a known communication method such as that used in a remote procedure call (RPC), and hence a detailed explanation thereof will be omitted.

In response to an order from the request responding unit 260, the storage processing unit 250 stores, in an execution state file, data stored in the continuation pools 211, 213, 215, and 217, data concerning the synchronization variable 220 described above, data concerning the queue 230, and the worker table 270. As the data concerning the synchronization variable 220, the synchronization variable ID and the synchronization variable object concerning each of the synchronization variables 220 stored in the synchronization variable table 225, and the continuation object registered in each of the synchronization variables 220 are stored. As the data concerning the queue 230, the queue ID and the queue object concerning each of the queues 230 stored in the queue table 235, and the continuation object registered in each of the queues 230 are stored. Note that the storage processing unit 250 stores the information in the execution state file, for example, by using a serializing mechanism so as to ensure consistency (for example, pointer operation) between the time of storage and the time of recovery.

Further, upon receiving from the request responding unit 260 an order to perform recovery, the storage processing unit 250 recovers the operation state of the worker 200, to which the storage processing unit 250 belongs, with the data in the most recently stored execution state file. More specifically, the data within this execution state file are reflected in each of the continuation pools, each of the synchronization variables 220, each of the queues 230, the synchronization variable table 225, and the queue table 235.

The request responding unit 260 receives a request from the master 100, and performs processing in accordance with the request. Processes performed by the request responding unit 260 will be specifically described in Example of Operation below.

[Master Process]

The master 100 includes a worker controlling unit 101. Through the worker controlling unit 101, the master 100 performs an entry process for the task to be processed, stores the execution state file of each of the workers 200, checks occurrence of failure in each of the workers 200, and makes recovery in the case where failure occurs in the worker 200. In the entry process for the task, the worker controlling unit 101 inputs, for example, a continuation object of the task into the continuation pool 211 for control of the worker 200 assigned with the task.

In the above description, the recovery made in the case where failure occurs in the worker 200 means a process in which all the workers 200 are returned to the execution state indicated by the execution state file stored at the time when the failure is detected. Processes performed by the worker controlling unit 101 will be specifically described in Example of Operation below.

[Spare Worker Process]

The spare worker 300 is a process operated in place of the worker 200 that suffers failure. Thus, it is only necessary that the spare worker 300 includes the same processing units as the worker 200, which is a replacement target, includes. The spare worker 300 may be generated when failure occurs in the worker 200, or may be generated in advance at the same time when the worker 200 is generated. Processes performed by the spare worker 300 will be specifically described in Example of Operation.

[Example of Operation]

Next, a description will be made of an example of operations performed by the distributed processing system 2 according to the second exemplary embodiment.

Figure 5:
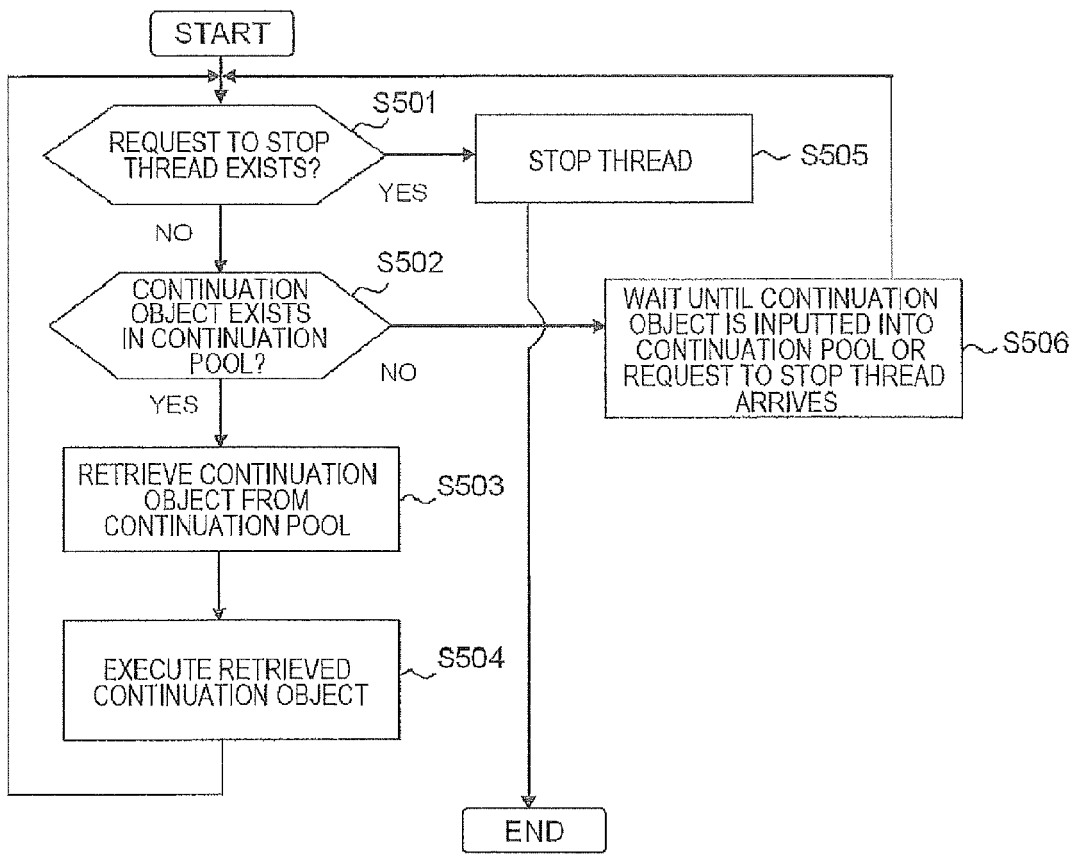
FIG. 5 is a flowchart showing an example of operations performed by a worker according to the second exemplary embodiment.

First, an example of operations performed by each of the workers 200 will be described with reference to FIG. 5 and FIGS. 6A and 6B. FIG. 5 is a flowchart showing an example of an operation performed by the worker 200 according to the second exemplary embodiment. FIGS. 6A and 6B are diagrams illustrating an example of details of processes in a task and an example of processing timing.

In the worker 200, before retrieving a continuation object from the continuation pool 211 for control, the control process thread 212 checks the presence or absence of a request to stop a thread (S501). When determining that there is the request to stop a thread (YES in S501), the control process thread 212 stops the process (S505). After the process is stopped, the control process thread 212 checks the presence or absence of a request to execute the thread at a given time, and if there is the request to execute the thread, the process may be resumed. Alternatively, the process may be resumed upon receiving the request to execute the thread from the request responding unit 260.

When determining that there is no request to stop a thread (NO in S501), the control process thread 212 judges whether a continuation object is stored in a continuation pool 211 for control corresponding to this control process thread 212 (S502). If the continuation object is not stored in the continuation pool 211 for control (NO in S502), the control process thread 212 waits until the continuation object is inputted into the continuation pool 211 for control, or the request to stop the thread arrives (S506).

If the continuation object is stored in the continuation pool 211 for control (YES in S502), the control process thread 212 retrieves the continuation object from the continuation pool 211 for control (S503). The control process thread 212 executes the retrieved continuation object (S504). If the continuation object contains a process of generating the next continuation object, the control process thread 212 generates the next continuation object, and inputs the generated continuation object into a corresponding continuation pool. If execution of the continuation object ends, the control process thread 212 checks the presence or absence of the request to stop the thread again before retrieving the next continuation object (S501). Similarly, these operations are performed in the calculation process thread 214, the disk process thread 216, and the network process thread 218.

In the second exemplary embodiment, the worker 200 includes plural process threads, and hence, the processes as described above can be executed in parallel. For example, it is assumed that a task as illustrated in FIG. 6A is inputted into the worker 200. The task in this example includes a process A and a process B. The process A includes a calculation A, a disk access process A (disk I/O A in FIG. 6A) and a network process A (network I/O A in FIG. 6A). The process B includes a calculation B, a disk access process B, and a network process B.

In this case, a continuation object including the calculation A and a continuation object including the calculation B are inputted into the continuation pool 213 for calculation; a continuation object including the disk access process A and a continuation object including the disk access process B are inputted into the continuation pool 215 for the disk; and a continuation object including the network process A and a continuation object including the network process B are inputted into the continuation pool 217 for network in a sequential manner.

The calculation process thread 214, the disk process thread 216, and the network process thread 218 each retrieve a continuation object from the corresponding continuation pools, and each execute the retrieved continuation object. With these operations, as illustrated in FIG. 6B, the unit of process in the process A and the unit of process in the process B are sequentially processed, while the calculation B and the disk access process A, and the disk access process B and the network process A are being processed in parallel.

As described above, according to the second exemplary embodiment, it is possible to obtain an effect similar to that of the first exemplary embodiment, in other words, to easily store the state of the task that is being processed, build a flexible system, and further achieve the rapid processing.

Figure 7:
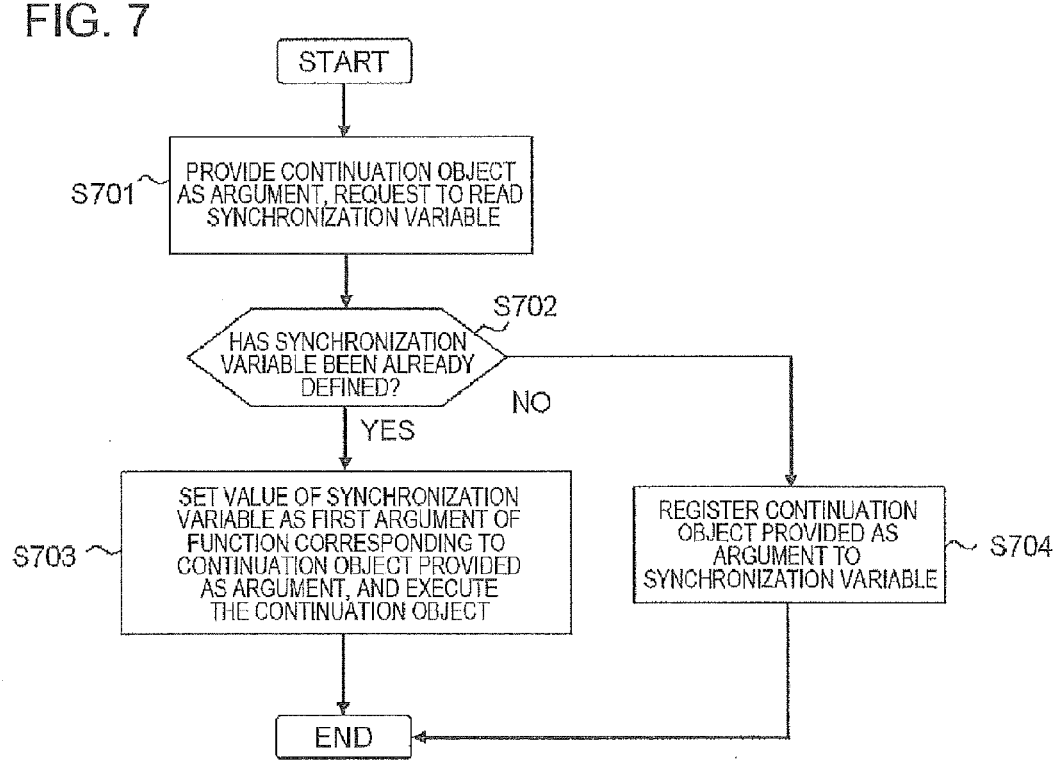
FIG. 7 is a flowchart showing an example of an operation performed at the time of reading out a synchronization variable.
Figure 8:
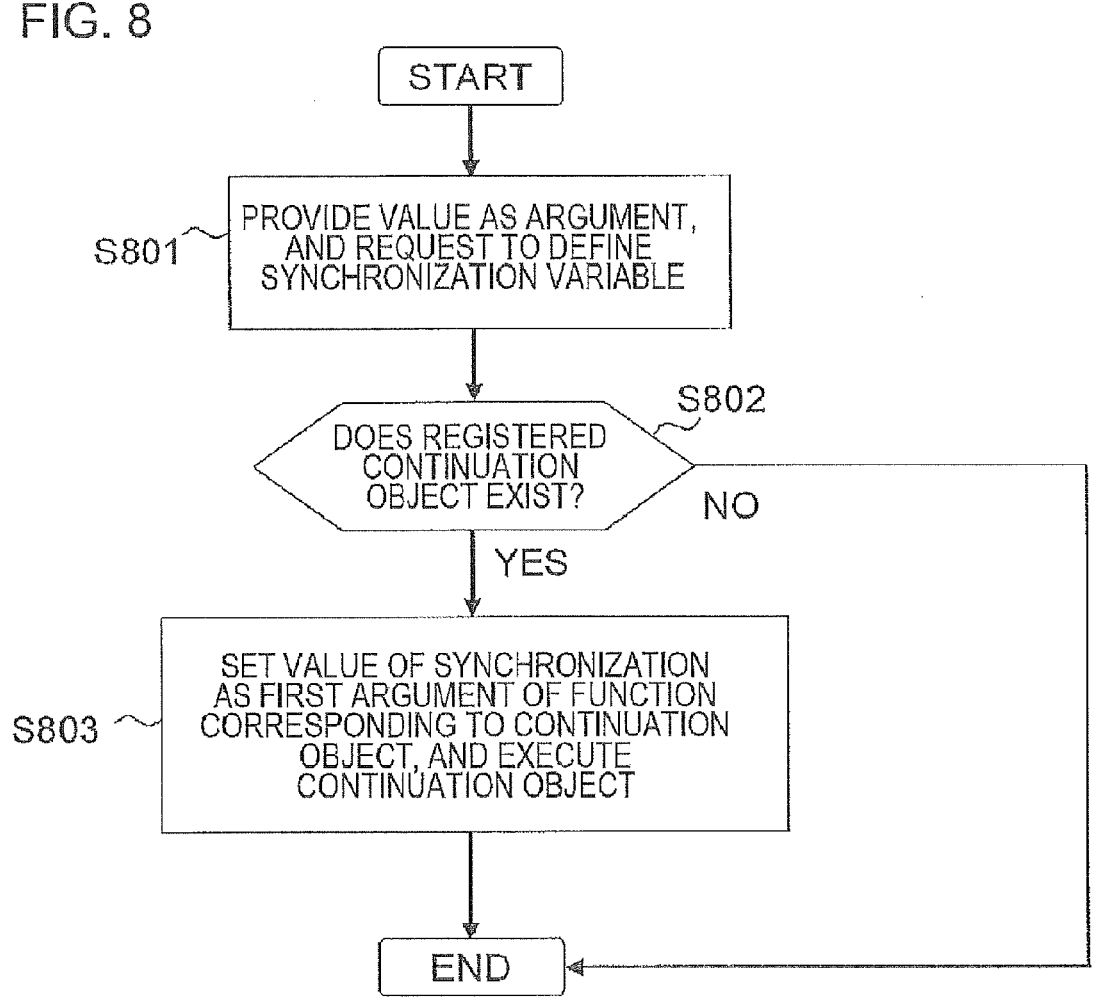
FIG. 8 is a flowchart showing an example of an operation performed at the time of performing writing to a synchronization variable.

Next, with reference to FIG. 7 and FIG. 8, a description will be made of processes at the time of reading out the synchronization variable 220 and writing to the synchronization variable 220 in each of the workers 200. FIG. 7 is a flowchart showing an example of an operation performed at the time of reading out the synchronization variable 220, and FIG. 8 is a flowchart showing an example of an operation performed at the time of writing to the synchronization variable 220. The operations shown in FIG. 7 and FIG. 8 are included in the execution (S504) of the continuation object in the example of the operation shown in FIG. 5 described above.

At the time of reading out the synchronization variable 220, a process thread provides a continuation object as an argument, and makes a reading-out request to the synchronization variable 220 (S701). The process thread checks whether the synchronization variable 220 has been already defined (S702). If the synchronization variable 220 is not defined (NO in S702), the process thread registers the continuation object provided as the argument to the synchronization variable 220 (S704), and ends the process.

If the synchronization variable 220 has been already defined (YES in S702), the process thread sets a value of the synchronization variable 220 as a first argument of a function corresponding to the continuation object provided as the argument, and executes the continuation object (S703). Note that, in this example of the operation, the value of the synchronization variable 220 is set to the first argument of the function corresponding to the continuation object. However, this exemplary embodiment is not limited to the example described above. For example, the value of the synchronization variable 220 may be set as a second argument.

At the time of writing to the synchronization variable 220, the process thread provides a value as an argument to make a defining request for the synchronization variable 220 (S801). If the continuation object registered in this synchronization variable 220 exists (YES in S802), the process thread sets a value of the synchronization variable 220 as a first argument of a function corresponding to the registered continuation object, and executes the continuation object (S803). If the continuation object registered in the synchronization variable 220 does not exist (NO in S802), the process thread ends the process.

FIG. 9 is a diagram illustrating an example of a task program that uses the synchronization variable 220. The task program illustrated in FIG. 9 as the example is obtained by modifying the example illustrated in FIG. 2B so as to use the synchronization variable 220.

In the example illustrated in FIG. 9, Sync<int> is a synchronization variable 220 to hold a int-type variable. In a sample function, a continuation object is created with a make_cont_noarg1 function to read out a value of the synchronization variable "a", this continuation object is provided as an argument, and a read member function of the synchronization variable "a" is called. The make_cont_noarg1 function generates a continuation object using a pointer of a inc function and a variable ret as arguments.

If a value of the synchronization variable "a" is defined, the value of the synchronization variable "a" is set as the first argument, and the continuation object, which is set as the read member function, is executed. Thus, for example, in the case of the examples illustrated in FIG. 3, a set_arg1( ) member function is called for the continuation object.

In the dbl function, a write member function is used to define a value of the synchronization variable ret. With this definition, if there exists a continuation object that waits for the value of the synchronization variable ret, in other words, a continuation object registered because the synchronization variable ret is not defined, this continuation object is executed. The synchronization variable 220 is managed with a synchronization variable ID as described above. Thus, in the example illustrated in FIG. 9, it may be possible to employ, for example, a configuration in which a variable with a Sync-type has a synchronization variable ID therein, and in the read member function or write member function, the address of a synchronization variable 220 corresponding to the synchronization variable ID is obtained from the synchronization variable table 225.

Figure 10:
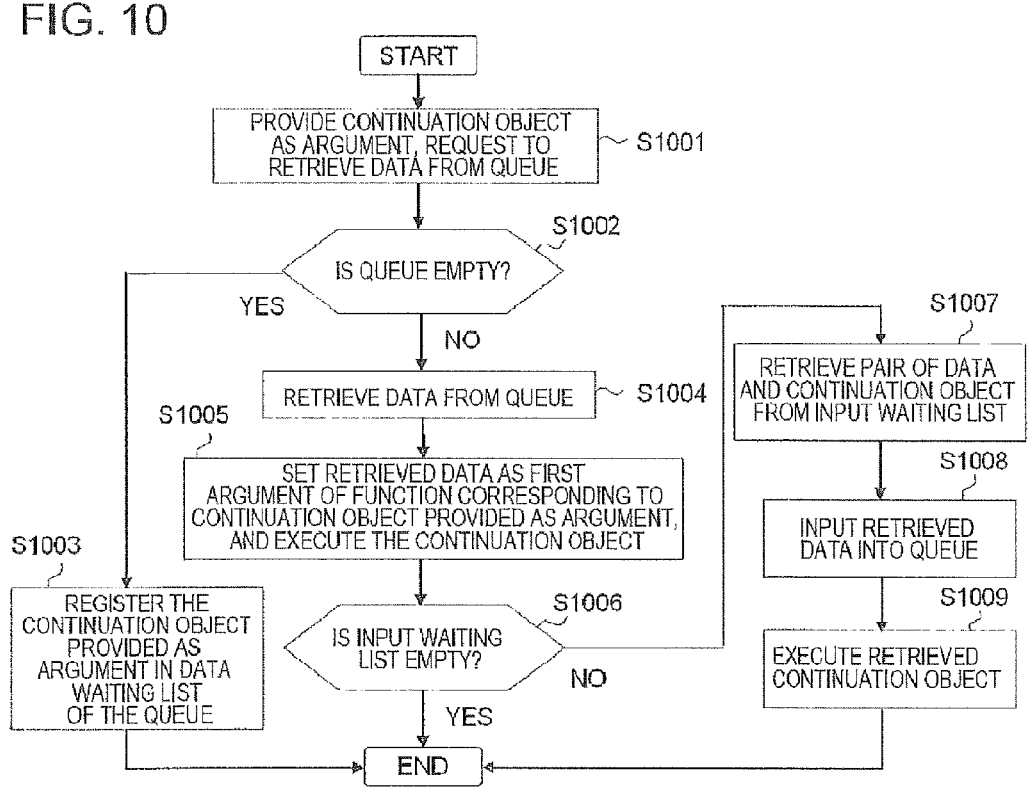
FIG. 10 is a flowchart showing an example of an operation performed at the time of retrieving data from a queue.
Figure 11:
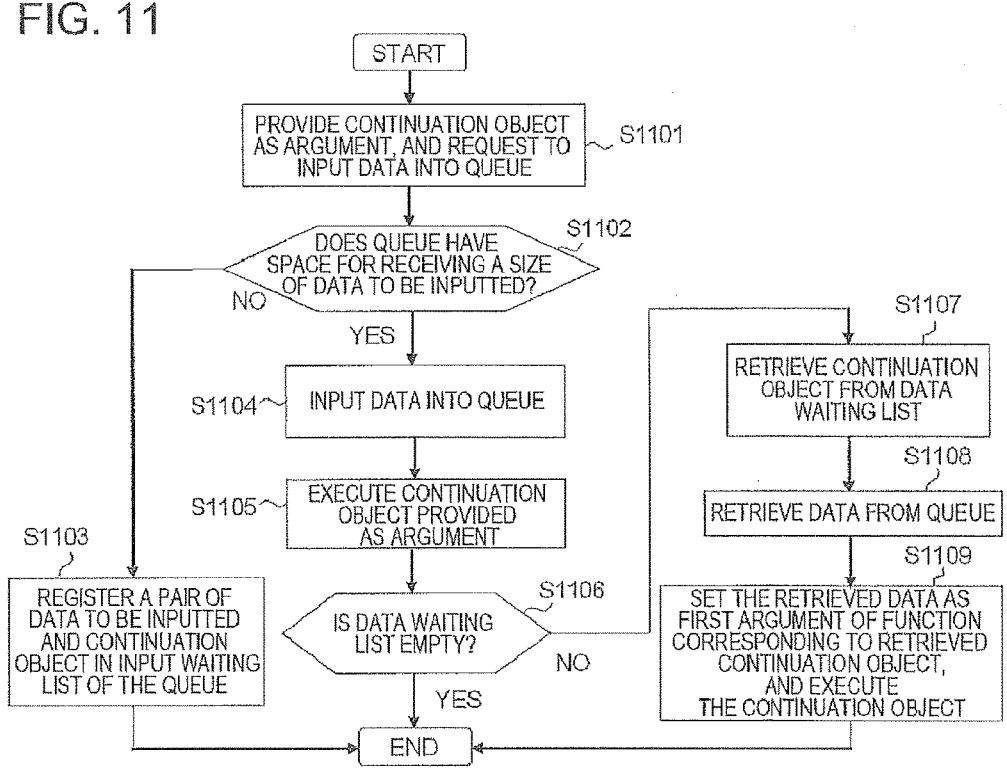
FIG. 11 is a flowchart showing an example of an operation performed at the time of inputting data into a queue.

Next, with reference to FIG. 10 and FIG. 11, a description will be made of an operation performed at the time of retrieving data from the queue 230 of each of the workers 200 and inputting data into the queue 230. FIG. 10 is a flowchart showing an example of an operation performed at the time of retrieving data from the queue 230, and FIG. 11 is a flowchart showing an example of an operation performed at the time of inputting data into the queue 230. Operations shown in FIG. 10 and FIG. 11 are included, for example, in execution (S504) of the continuation object in the example of the operation shown in FIG. 5 described above.

When the data are retrieved from the queue 230, a process thread provides a continuation object as an argument, and makes a request to retrieve data from the queue 230 (S1001). If the queue 230 is empty (YES in S1002), the process thread registers the continuation object provided as the argument in a data waiting list of the queue 230 (S1003).

If the queue 230 is not empty (NO in S1002), the process thread retrieves the data from the queue 230 (S1004). Then, the process thread sets the retrieved data as a first argument of a function corresponding to the continuation object provided as the argument, and executes the continuation object (S1005).

Then, the process thread checks whether the input waiting list of the queue 230 is empty (S1006). If the input waiting list is empty (YES in S1006), the process thread ends the process, whereas, if the input waiting list is not empty (NO in S1006), a pair of the data and the continuation object is retrieved from the input waiting list (S1007). The process thread inputs the retrieved data into the queue 230 (S1008), and executes the continuation object retrieved in a similar manner (S1009).

When the data are inputted into the queue 230, the process thread provides a continuation object as an argument, and makes a request to input the data into the queue 230 (S1101). Then, the process thread judges whether the queue 230 has a space sufficient for the size of the data to be inputted (S1102). If the queue 230 does not have the sufficient space (NO in S1102), the process thread registers a pair of the data and the continuation object to be inputted in the input waiting list of the queue 230 (S1103).

If the queue 230 has the sufficient space (YES in S1102), the process thread inputs the data into the queue 230 (S1104), and further, executes the continuation object provided as the argument (S1105).

Then, the process thread judges whether the data waiting list of the queue 230 is empty or not (S1106). If the data waiting list is empty (YES in S1106), the process thread ends the process. If the data waiting list is not empty (NO in S1106), the process thread retrieves the continuation object from the data waiting list (S1107).

Then, the process thread retrieves the data from the queue 230 (S1108), sets the retrieved data as a first argument of a function corresponding to the retrieved continuation object, and executes the continuation object (S1109). This makes it possible to carry on the process in the case where the queue 230 is empty when the data are retrieved from the queue 230.

Figure 12:
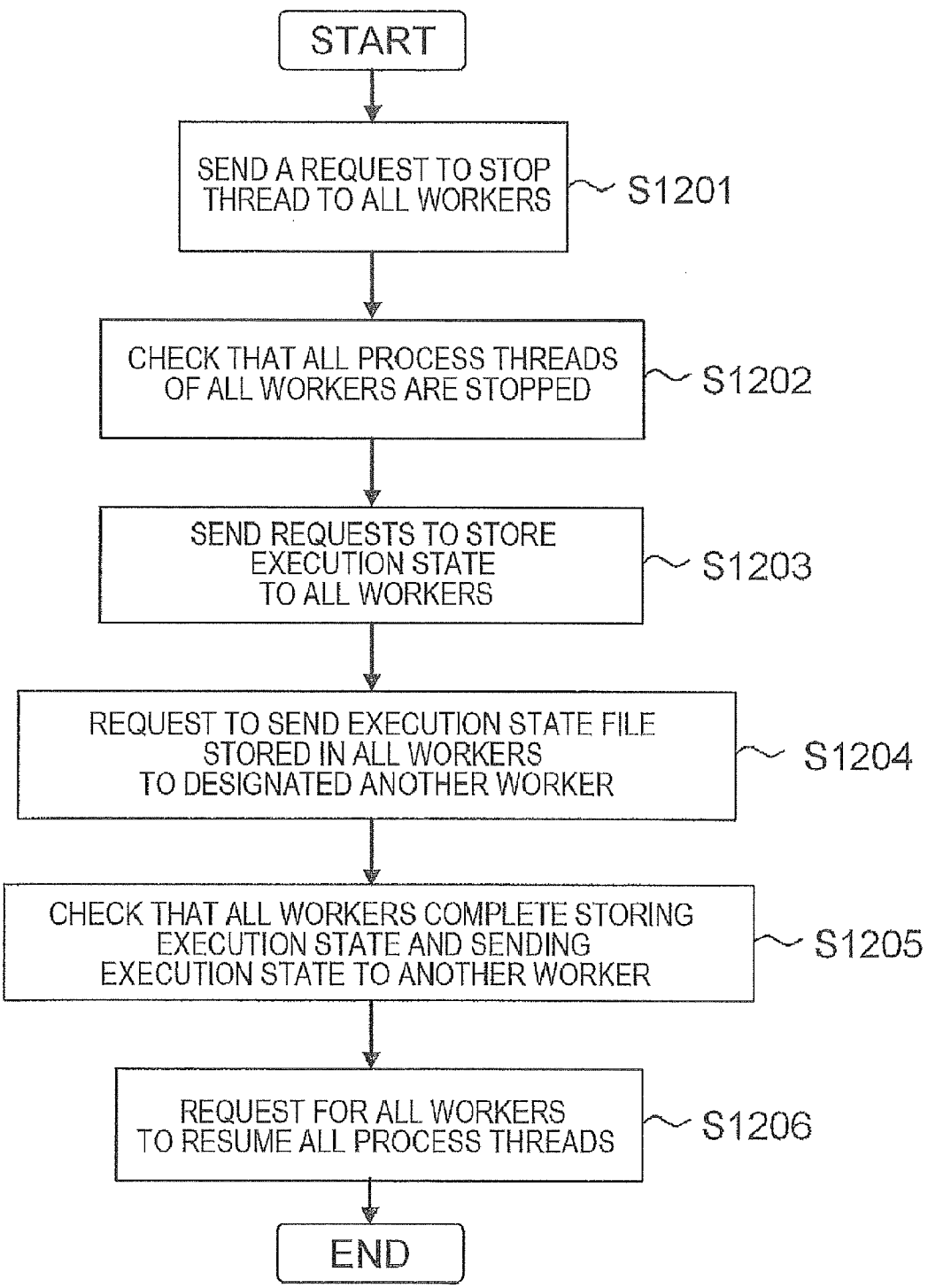
FIG. 12 is a flowchart showing an example of an operation performed when a master stores an execution state of each worker.

Next, with reference to FIG. 12, a description will be made of an example of an operation performed at the time of storing an execution state of each of the workers 200. FIG. 12 is a flowchart showing an example of an operation performed when the master 100 stores an execution state of each of the workers 200. The master 100 executes the following process of storing an execution state of each of the workers 200 at predetermined intervals. Note that the process is not limited to be performed at predetermined intervals, and may be performed at any time.

After starting the process of storing the execution state, the worker controlling unit 101 of the master 100 sends a request to stop a thread to all the workers 200 (S1201). With this request, as described above, the process thread of each of the workers 200 checks the presence or absence of the request to stop the thread (S501 in FIG. 5), and ends the process (S505 in FIG. 5). At this time, for example, the request responding unit 260 of each of the workers 200 checks that all the process threads in the worker 200 to which this request responding unit 260 belongs are stopped, and notifies the master 100 to that effect.

Upon checking that all the process threads in all the workers 200 are stopped (S1202), the worker controlling unit 101 then sends, to all the workers, a request to store the execution states (S1203). With this request, the storage processing units 250 of all the workers 200 serialize data stored at this point in time, and store the data in the execution state file. The stored data include the data stored in the continuation pool 211 for control, the continuation pool 213 for calculation, the continuation pool 215 for disk, and the continuation pool 217 for network, the data concerning the synchronization variable 220, the data concerning the queue 230, and the data on the worker table 270.

Further, the worker controlling unit 101 makes a request to all the workers 200 to send the stored execution state file to another worker assigned (S1204). For example, the other worker is assigned to another worker performed on a device (node) different from the device on which the worker itself is performed. This is because, when failure occurs in a node, an execution state file stored in the failure node cannot be accessed. With this configuration, the storage processing unit 250 of each of the workers 200 sends a copy of the stored execution state file to the designated other worker. As a result, the execution state file of each of the workers 200 is stored in at least two devices (nodes). The worker controlling unit 101 retains information on the worker to which the execution state file of each of the workers 200 is stored.

Upon checking that all the workers complete storing the execution state and sending the execution state file to the other worker (S1205), the worker controlling unit 101 makes a request to all the workers 200 to resume all the process threads (S1206). With this configuration, it is possible to store the execution states of all the process threads of all the workers 200 at a certain point in time.

It should be noted that, in the procedure described above, an example has been given in which the worker controlling unit 101 of the master 100 controls each of the workers 200. However, it may be possible to employ a configuration in which the worker controlling unit 101 only sends, to all the workers 200, a request to store the execution state, and each of the workers 200 controls stopping the thread, storing the execution state file, sending the execution state file to the other worker, and resuming the thread.

Figure 13:
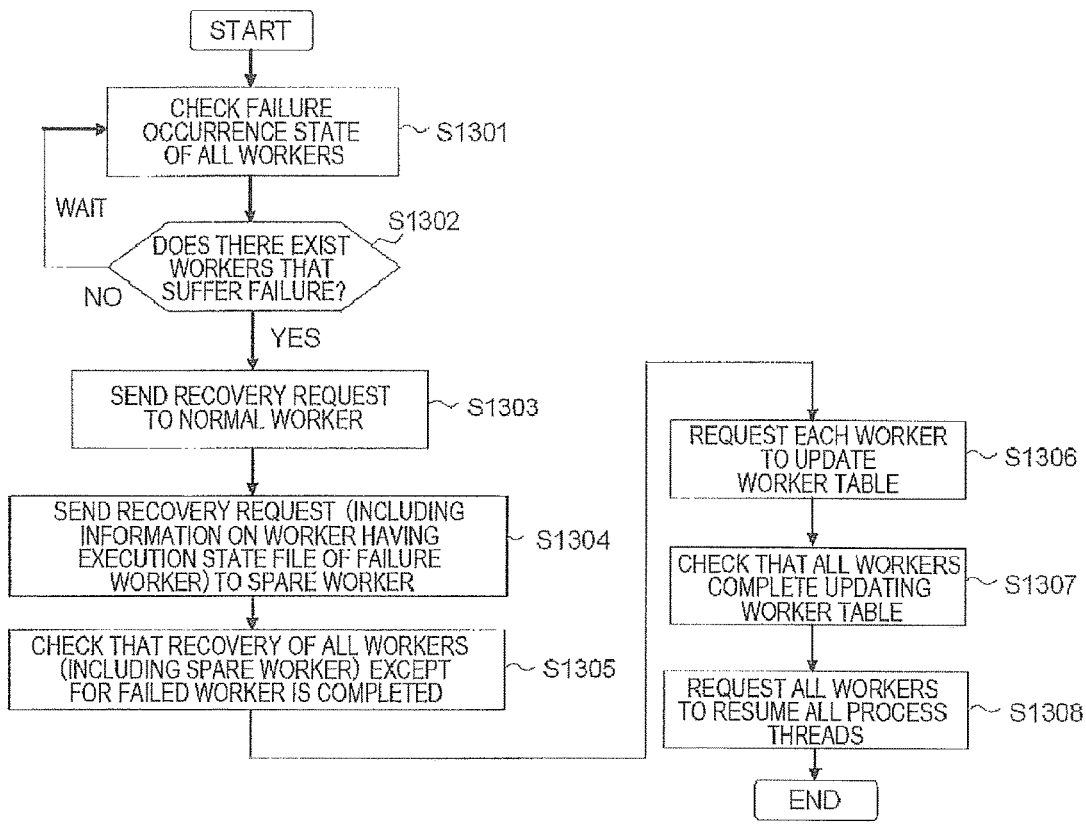
FIG. 13 is a flowchart showing an example of an operation for recovering from occurrence of failure of a worker in the distributed processing system according to the second exemplary embodiment.

Next, with reference to FIG. 13, a description will be made of an example of a recovery operation performed when failure occurs in a worker in the distributed processing system 2 according to the second exemplary embodiment. FIG. 13 is a flowchart showing an example of a recovery operation performed when failure occurs in a worker in the distributed processing system 2 according to the second exemplary embodiment.

The master 100 checks a failure occurrence state of each of the workers 200 at predetermined intervals through the worker controlling unit 101 (S1301, S1302, and NO in S1302). Note that this process is not limited to be executed at predetermined intervals, and may be executed at any time.

When determining that there is a worker suffering failure (hereinafter, referred to as failure worker) (YES in S1302), the worker controlling unit 101 of the master 100 sends a recovery request to normal workers other than the failure worker (S1303). Upon receiving this request, the storage processing unit 250 of each of the normal workers recovers the operation state of a worker 200 to which this storage processing unit 250 belongs with data existing in the most recently stored execution state file. More specifically, after stopping each of the process threads, the storage processing unit 250 applies the data in the execution state file to each of the continuation pools, the synchronization variable 220, the synchronization variable table 225, the queue 230, the queue table 235, and the worker table 270.

Then, the worker controlling unit 101 sends a recovery request to the spare worker 300 (S1304). This recovery request includes, for example, a worker ID of a worker having the execution state file of the failure worker. With this configuration, in the spare worker 300, the storage processing unit 250 acquires the execution state file from the other worker identified on the basis of the worker ID, and recovers the operation state using the data contained in the execution state file. With this operation, in the spare worker 300, the execution state of the failure worker can be recovered.

After checking that recovery of all the workers (including the spare worker 300) other than the failure worker is completed (S1305), the worker controlling unit 101 requires each of the workers to update the worker table 270 (S1306). With this operation, in each of the workers including the spare worker 300, information on the failure worker and information on the spare worker 300 used as a replacement of the failure worker are applied to the worker table 270.

After checking that the worker tables 270 of all the workers are updated (S1307), the worker controlling unit 101 requests all the worker to resume all the process threads (S1308). Upon receiving this request, the normal workers and the spare worker 300 resume each of the process threads. With this configuration, the operation state of the distributed processing system 2 is recovered with the most recently stored execution state after failure was detected to occur in the worker.

As described above, the second exemplary embodiment is provided with the synchronization variable 220 and the queue 230, each of which is a mechanism for synchronizing data, and thus, the tasks can be processed in parallel, whereby it is possible to achieve rapid processing. Further, the second exemplary embodiment also stores the data concerning the synchronization variable 220 and the queue 230 at the time of storing the execution state, which makes it possible to store the complete execution state.

Further, in the second exemplary embodiment, the master 100 checks the failure occurrence state of each of the workers 200 while controlling storing the execution state of each of the workers 200. At the time of failure occurring, the execution state file and the spare worker are used to recover to the execution state before the occurrence of the failure and resume the execution, which makes it possible to achieve reliable processing.

[Hardware Configuration]

Figure 14:
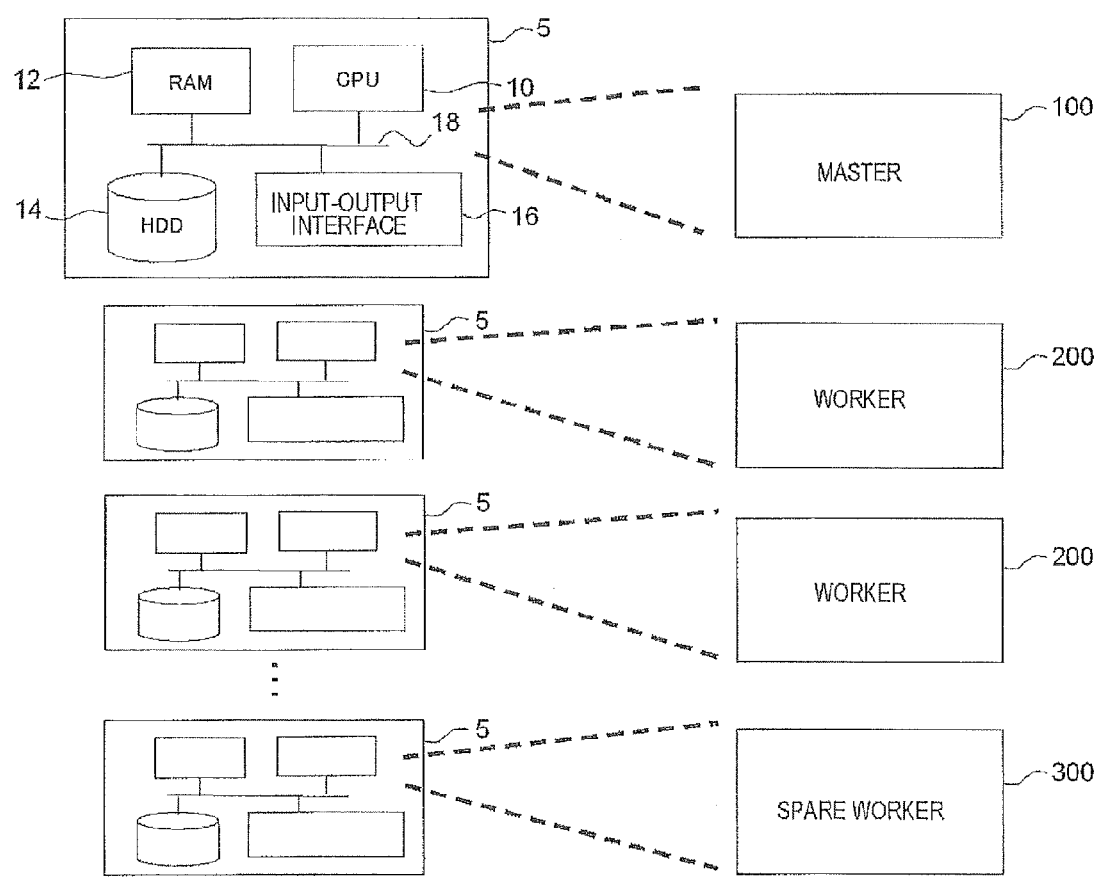
FIG. 14 is a schematic view illustrating an example of a hardware configuration of the distributed processing system according to the second exemplary embodiment.

FIG. 14 is a schematic view illustrating an example of a hardware configuration of the distributed processing system 2 according to the second exemplary embodiment. The distributed processing system 2 according to the second exemplary embodiment is formed by plural computers 5. In this specification, the computer 5 represents a concept representing a group of hardware elements including a CPU 10, a memory (for example, a RAM 12, a ROM (not illustrated), and a hard disk (HDD) 14), and an input-output interface 16 and provided for executing a program stored in the memory. Thus, the computer 5 may be realized as one device such as a personal computer, or may be a unit such as a CPU board that can be attached plurally to one device. In the above description, the computer 5 is also referred to as a node.

As illustrated in FIG. 14, it is desirable that the master 100, each of the workers 200, and the spare worker 300 are realized on different computers (nodes) 5. With this configuration, if any trouble occurs in the worker 200 resulting from failure of the computer 5, recovery is made with the spare worker 300 realized on the other computer. The master 100, each of the workers 200, and the spare worker 300 in the distributed processing system 2 are realized by causing the CPU 10 to execute a program stored in the memory in each of the computers 5. This also applies to each processing unit constituting the master 100, each of the workers 200, and the spare worker 300.

Further, in the second exemplary embodiment, one process thread is associated with one continuation pool. However, it may be possible to share one continuation pool with plural process threads, or to associate one process thread with plural continuation pools.

All or part of the exemplary embodiments and the modification examples described above may be specified in a manner as described in the following Supplemental Notes. However, the exemplary embodiments and the modification examples are not limited to the following descriptions.

[Supplementary Note 1]

A distributed processing device including:

an object storage unit that stores a continuation object including at least one of plural processes constituting a task and containing data of the task that is being processed;

a processing unit that executes the continuation object retrieved from the object storage unit; and a storage processing unit that stores, in an execution state file, data stored in the object storage unit.

[Supplementary Note 2]

The distributed processing device according to Supplemental Note 1, in which the processing unit executes the continuation object to generate a next continuation object, store the generated next continuation object in the object storage unit, and then, ends executing the continuation object.

[Supplementary Note 3]

The distributed processing device according to Supplemental Note 1 or 2, in which the object storage unit includes plural object storage units, and the processing unit includes plural processing units, each of the object storage units stores a continuation object that uses a different calculation resource, and each of the processing units executes a continuation object retrieved from each of the object storage units in parallel.

[Supplementary Note 4]

The distributed processing device according to Supplemental Note 3, further including a synchronization variable, in which in a case where a first continuation object that is being executed reads a synchronization variable that is in an undefined state, at least one of the plural processing units registers a second continuation object in the synchronization variable, and then, ends executing the first continuation object, and the storage processing unit further stores, in the execution state file, the second continuation object registered in the synchronization variable.

[Supplementary Note 5]

The distributed processing device according to Supplemental Note 3 or 4 further including a data retaining unit, in which in a case where a first continuation object that is being executed retrieves data from an empty data retaining unit or inputs the volume of data exceeding a limit of the data retaining unit, at least one of the plural processing units registers a second continuation object in the data retaining unit, and then ends executing the first continuation object, and the storage processing unit further stores, in an execution state file, the second continuation object registered in the data retaining unit.

[Supplementary Note 6]

A distributed processing system formed by plural computers, including plural worker processes each comprising:
  an object storage unit that stores a continuation object including at least one of plural processes constituting a task and containing data of the task that is being processed;
  a processing unit that executes the continuation object retrieved from the object storage unit; and
  a storage processing unit that stores, in an execution state file, data stored in the object storage unit, and
a master process that makes a request to each of the worker processes to cause the storage processing unit to perform the storage process at a predetermined timing, in which when making the request to perform the storage process, the master process assigns, to each of the worker processes, another worker process for storing the execution state file.

[Supplementary Note 7]

The distributed processing system according to Supplemental Note 6 further including a spare worker process comprising the plural object storage units, the plural processing units, and the storage processing unit, which are included in each of the worker processes, in which in a case where a worker process that suffers failure is detected, the storage processing unit of the spare worker process acquires an execution state file of the worker process that suffers the failure from another worker process, and restores data contained in the acquired execution state file to each of the object storage units, and in the case where a worker process that suffers failure is detected, the storage processing unit of a worker process other than the worker process that suffers the failure restores, to each of the object storage units, data contained in the execution state file of the worker process to which the storage processing unit belongs.

[Supplementary Note 8]

The distributed processing system according to Supplemental Note 7, in which the plural worker processes and the spare worker process each further include a worker table for storing information on each of the worker processes, and the master process causes each of the worker processes other than the worker process that suffers the failure and the spare worker process to update the worker table with information on the worker that suffers the failure and information on the spare worker process.

[Supplementary Note 9]

A distributed processing method performed by at least one computer, including:

generating a continuation object including at least one of plural processes constituting a task and containing data of the task that is being processed;

storing the generated continuation object in an object storage unit;

retrieving the continuation object from the object storage unit;

executing the retrieved continuation object; and storing, in an execution state file, data stored in the object storage unit.

[Supplementary Note 10]

The distributed processing method according to Supplemental Note 9, further including:

executing, by said at least one computer, the continuation object to generate a next continuation object; and storing, by said at least one computer, the generated next continuation object in the object storage unit, and then, ending executing the continuation object.

[Supplementary Note 11]

A program that causes at least one computer to realize:

an object storage unit that stores a continuation object including at least one of plural processes constituting a task and containing data of the task that is being processed;

a processing unit that executes the continuation object retrieved from the object storage unit; and a storage processing unit that stores, in an execution state file, data stored in the object storage unit.

[Supplementary Note 12]

The program according to Supplemental Note 11, in which the processing unit executes the continuation object to generate a next continuation object, stores the generated next continuation object in the object storage unit, and then, ends executing the continuation object.

[Supplementary Note 13]

The program according to Supplemental Note 11 or 12, in which the computer is caused to realize that the object storage unit includes plural object storage units and the processing unit includes plural processing units, each of the object storage units stores a continuation object that uses a different calculation resource, and each of the processing units executes a continuation object retrieved from each of the object storage units in parallel.

[Supplementary Note 14]

The program according to Supplemental Note 13, in which the computer is caused to realize a synchronization variable, in a case where a first continuation object that is being executed reads out a synchronization variable that is in an undefined state, at least one of the plural processing units registers a second continuation object in the synchronization variable, and then, ends executing the first continuation object, and the storage processing unit further stores, in the execution state file, the second continuation object registered in the synchronization variable.

[Supplementary Note 15]

The program according to Supplemental Note 13 or 14, in which said at least one computer is caused to further realize a data retaining unit, in a case where a first continuation object that is being executed retrieves data from an empty data retaining unit or inputs the volume of data exceeding a limit of the data retaining unit, at least one of the plural processing units registers a second continuation object in the data retaining unit, and then, ends executing the first continuation object, and the storage processing unit further stores, in an execution state file, the second continuation object registered in the data retaining unit.

[Supplementary Note 16]

A program that causes a distributed processing system formed by plural computers to realize:

plural worker processes each including:

an object storage unit that stores a continuation object including at least one of plural processes constituting a task and containing data of the task that is being processed;

a processing unit that executes the continuation object retrieved from the object storage unit; and a storage processing unit that stores, in an execution state file, data stored in the object storage unit, and a master process that makes a request to each of the worker processes to cause the storage processing unit to perform the storage process at a predetermined timing, in which when making the request to perform the storage process, the master process assigns, to each of the worker processes, another worker process for storing the execution state file.

[Supplementary Note 17]

The program according to Supplemental Note 16, in which the program causes the distributed processing system to further realize the space worker process comprising the plural object storage units, the plural processing units, and the storage processing unit in each of the worker processes, in a case where a worker process that suffers failure is detected, the storage processing unit of the spare worker process acquires an execution state file of the worker process that suffers the failure from another worker process, and restores data contained in the acquired execution state file to each of the object storage units, and in the case where a worker process that suffers the failure is detected, the storage processing unit of each worker process other than the worker process that suffers the failure restores, to each of the object storage units, data contained in the execution state file of the worker process to which the storage processing unit belongs.

[Supplementary Note 18]

The program according to Supplemental Note 17, in which the plural worker processes and the spare worker process each further include a worker table for storing information on each of the worker processes, and the master process causes each of the worker processes other than the worker process that suffers the failure and the spare worker process to update the worker table with information on the worker process that suffers the failure and the spare worker process.

The present application claims priority based on Japanese Patent Application No. 2010-231144 filed in Japan on Oct. 14, 2010, the disclosures of which are incorporated herein by reference in their entirety.

The invention claimed is:

1. A distributed processing device comprising:

an object storage unit that stores a continuation object including at least one of a plurality of processes constituting a task and containing data of the task that is being processed;

a processor that executes the continuation object retrieved from the object storage unit; and a storage processing unit that stores in a non-transitory computer readable medium, in an execution state file, data stored in the object storage unit, wherein the processor executes a process of a first continuation object and generates a second continuation object, a process of the second continuation object being executed using a result of the process of the first continuation object, and wherein the processor stores the second continuation object in the object storage unit, and then ends executing the process of the first continuation object, further comprising a synchronization variable, wherein:

in a case where a process of a third continuation object that is being executed reads a synchronization variable that is in an undefined state, the processor registers a fourth continuation object in the synchronization variable, and then ends executing the process of the third continuation object, and the storage processing unit further stores, in the execution state file, the fourth continuation object registered in the synchronization variable.

2. The distributed processing device according to claim 1, wherein the object storage unit includes a plurality of object storage units and the processor includes a plurality of processing units, each of the object storage units stores a continuation object that uses a different calculation resource, and each of the processing units executes a process of a continuation object retrieved from each of the object storage units in parallel.

3. The distributed processing device according to claim 2 further comprising a data retaining unit, wherein
in a case where a process of a third continuation object that is being executed retrieves data from an empty data retaining unit or inputs the volume of data exceeding a limit of the data retaining unit, at least one of the plurality of the processing units registers the fourth continuation object in the data retaining unit, and then ends executing the process of the third continuation object, and
the storage processing unit further stores, in an execution state file, the fourth continuation object registered in the data retaining unit.

4. The distributed processing device according to claim 1, wherein:
the object storage unit comprises a non-transitory computer readable medium that stores the continuation object including at least one of the plurality of processes constituting the task and containing data of the task that is being processed,
the processing unit comprises a processor that retrieves and executes the continuation object stored in the object storage unit to change the continuation object, and
the storage processing unit comprises a non-transitory computer readable medium that stores, in the execution state file, data stored in the object storage unit.

5. The distributed processing device according to claim 1, further comprising a data retaining unit, wherein:
in a case where a process of a third continuation object that is being executed retrieves data from an empty data retaining unit or inputs the volume of data exceeding a limit of the data retaining unit, the processor registers the fourth continuation object in the data retaining unit, and then ends executing the process of the third continuation object, and
the storage processing unit further stores, in an execution state file, the fourth continuation object registered in the data retaining unit.

6. The distributed processing device according to claim 1, wherein the continuation object reflects a state of the task that is currently processed and is stored in the execution state file.

7. The distributed processing device according to claim 1, wherein the object storage unit stores the continuation object including the at least one of the plurality of processes constituting the task and containing the data of the task obtained during a time when the task is being processed, and
wherein the processor executes the continuation object stored in the object storage unit, thereby processing the task.

8. A distributed processing system formed by a plurality of computers, comprising
a plurality of worker processes each including:
an object storage unit that stores a continuation object including at least one of a plurality of processes constituting a task and containing data of the task that is being processed;
a processing unit that retrieves and executes a continuation object stored in the object storage unit; and
a storage processing unit that stores, in an execution state file, data stored in the object storage unit, and
a master process that makes a request to each of the worker processes to cause the storage processing unit to perform the storage process at a predetermined time, wherein when making the request to perform the storage process, the master process assigns, to each of the worker processes, another worker process for storing the execution state file,
wherein the processing unit executes a process of a first continuation object and generates a second continuation object, a process of the second continuation object being executed using a result of the process of the first continuation object, and
wherein the processing unit stores the second continuation object in the object storage unit, and then ends executing the process of the first continuation object,
further comprising a synchronization variable, wherein:
in a case where a process of a third continuation object that is being executed reads a synchronization variable that is in an undefined state, the processor registers a fourth continuation object in the synchronization variable, and then ends executing the process of the third continuation object, and
the storage processing unit further stores, in the execution state file, the fourth continuation object registered in the synchronization variable.

9. The distributed processing system according to claim 8, further comprising a spare worker including the plurality of object storage units, a plurality of processing units, and the storage processing unit in each of the worker processes, wherein
in a case where a worker process that suffers failure is detected, the storage processing unit of the spare worker process acquires an execution state file of the worker process that suffers the failure from another worker process, and restores data contained in the acquired execution state file to each of the object storage units, and
in the case where a worker process that suffers the failure is detected, the storage processing unit of a worker process other than the worker process that suffers the failure restores, to each of the object storage units, data contained in the execution state file of the worker process to which the storage process unit belongs.

10. The distributed processing system according to claim 9, wherein
the plurality of the worker processes and the space worker process each further include a worker table for storing information on each of the worker processes, and
the master process causes each of the worker processes other than the worker process that suffers the failure and the spare worker process to update the worker table with information on the worker that suffers the failure and information on the space worker process.

11. A distributed processing method performed by at least one computer, the method comprising:
generating a continuation object including at least one of a plurality of processes constituting a task and containing data of the task that is being processed;
storing the generated continuation object in an object storage unit;
retrieving the continuation object stored in the object storage unit;
executing the continuation object stored in the object storage unit:
storing, in an execution state file stored in a storage processing unit, data stored in the object storage unit,
executing a process of a first continuation object and generating a second continuation object, a process of the second continuation object being executed using a result of the process of the first continuation object; and storing the second continuation object in the object storage unit, and then ending executing the process of the first continuation object, further comprising a synchronization variable, wherein:

in a case where a process of a third continuation object that is being executed reads a synchronization variable that is in an undefined state, the processor registers a fourth continuation object in the synchronization variable, and then ends executing the process of the third continuation object, and the storage processing unit further stores, in the execution state file, the fourth continuation object registered in the synchronization variable.

12. The distributed processing method according to claim 11, further including:

executing, by said at least one computer, the continuation object to generate a next continuation object; and storing, by said at least one computer, the generated next continuation object in the object storage unit, and then, ending executing the continuation object.

13. A non-transitory computer-readable storage medium storing a program for causing at least one computer to realize:

an object storage unit that stores a continuation object including at least one of a plurality of processes constituting a task and containing data of the task that is being processed;

a processing unit that retrieves and executes a continuation object stored in the object storage unit; and a storage processing unit that stores, in an execution state file, data stored in the object storage unit, wherein the processing unit executes a process of a first continuation object and generates a second continuation object, a process of the second continuation object being executed using a result of the process of the first continuation object, and wherein the processing unit stores the second continuation object in the object storage unit, and then ends executing the process of the first continuation object, further comprising a synchronization variable, wherein:

in a case where a process of a third continuation object that is being executed reads a synchronization variable that is in an undefined state, the processor registers a fourth continuation object in the synchronization variable, and then ends executing the process of the third continuation object, and the storage processing unit further stores, in the execution state file, the fourth continuation object registered in the synchronization variable.

14. The non-transitory computer-readable storage medium storing the program according to claim 13, wherein the processing unit executes the continuation object to generate a next continuation object, stores the generated next continuation object in the object storage unit, and then, ends executing the continuation object.

15. The non-transitory computer-readable storage medium storing the program according to claim 13, wherein the computer is caused to realize that the object storage unit includes plural object storage units and the processing unit includes plural processing units, each of the object storage units stores a continuation object that uses a different calculation resource, and each of the processing units executes a continuation object retrieved from each of the object storage units in parallel.

16. The non-transitory computer-readable storage medium storing the program according to claim 15, wherein the computer is caused to realize the synchronization variable.

17. The non-transitory computer-readable storage medium storing the program according to claim 15, wherein said at least one computer is caused to further realize a data retaining unit, in a case where a data retaining unit has no data to be retrieved at a time when a process of a third continuation object being executed retrieves data or the data retaining unit does not have a space sufficient for receiving an amount of data to be inputted at a time when the third continuation object being executed inputs, at least one of the plural processing units registers a fourth continuation object in the data retaining unit, and then, ends executing the process of the third continuation object, and the storage processing unit further stores, in an execution state file, the fourth continuation object registered in the data retaining unit.

* * * * *